US010264334B2

(12) United States Patent
Javidi et al.

(10) Patent No.: US 10,264,334 B2
(45) Date of Patent: Apr. 16, 2019

(54) END-TO-END SCHEDULING FOR ALL-OPTICAL DATA CENTERS

(71) Applicant: The Regents of the University of California, Oakland, CA (US)

(72) Inventors: Tara Javidi, San Diego, CA (US); Chang-Heng Wang, La Jolla, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 405 days.

(21) Appl. No.: 15/137,785

(22) Filed: Apr. 25, 2016

(65) Prior Publication Data

US 2016/0316284 A1    Oct. 27, 2016

Related U.S. Application Data

(60) Provisional application No. 62/152,212, filed on Apr. 24, 2015.

(51) Int. Cl.
*H04J 14/00* (2006.01)
*H04Q 11/00* (2006.01)

(52) U.S. Cl.
CPC ... *H04Q 11/0005* (2013.01); *H04Q 2011/005* (2013.01); *H04Q 2011/0033* (2013.01); *H04Q 2011/0045* (2013.01)

(58) Field of Classification Search
CPC ........... H04Q 11/0066; H04Q 11/0062; H04Q 11/0005; H04Q 2011/005; H04Q 2011/0064; H04Q 2011/0052; H04Q 11/0067; H04L 47/12

USPC ........ 398/45, 46, 47, 48, 49, 50, 51, 53, 56, 398/57, 79, 33, 38, 25; 370/392, 352, 370/389, 468, 412, 395.4, 225, 228, 474
See application file for complete search history.

(56) References Cited

U.S. PATENT DOCUMENTS

| | | | | |
|---|---|---|---|---|
| 7,046,665 B1 * | 5/2006 | Walrand | ................. | H04L 47/10 370/392 |
| 2002/0122428 A1 * | 9/2002 | Fan | ..................... | H04L 12/5602 370/395.4 |

OTHER PUBLICATIONS

C.-H. Wang, T. Javidi, and G. Porter, "End-to-end scheduling for all-optical data centers," in INFOCOM, 2015 Proceedings IEEE, Apr. 2015 (10 pages total).
K. Ross and N. Bambas, "Adaptive batch scheduling for packet switching with delays," in High-performance Packet Switching Architecture, pp. 65-79, Springer London, 2007 (16 pages total).

(Continued)

*Primary Examiner* — Hanh Phan
(74) *Attorney, Agent, or Firm* — Stuart H. Mayer; Mayer & Williams PC

(57) ABSTRACT

An end-to-end method is provided for scheduling connections for networks such as all-optical data centers, which have a zero in-network buffer and a non-negligible reconfiguration delay in which the rate of schedule reconfiguration is limited to minimize the impact of reduced duty-cycles and to ensure bounded delay without overly restricting the rate of monitoring and decision processes. The method decouples the rate of scheduling from the rate of monitoring. A scheduling algorithm for switches with a reconfiguration delay is used which is based on the well-known MaxWeight scheduling policy. The scheduling policy requires no prior knowledge of traffic load.

20 Claims, 11 Drawing Sheets

(56) References Cited

OTHER PUBLICATIONS

G. Porter, R. Strong, N. Farrington, A. Forencich, P. Chen-Sun, T. Rosing, Y. Fainman, G. Papen, and A. Vahdat, "Integrating microsecond circuit switching into the data center," in Proceedings of the ACM SIGCOMM 2013 Conference on SIGCOMM, SIGCOMM '13, !New York, NY, USA), pp. 447-458, ACM, 2013 (12 pages total).
H. Liu, F. Lu, A. Forencich, R. Kapoor, M. Tewari, G. M. Voelker, G. Papen, A. C. Snoeren, and G. Porter, "Circuit switching under theradar with reactor," in Proceedings of the 11th USENIX Conference on Networked Systems Design and Implementation, NSDI' 14, (Berkeley, CA, USA), pp. 1-15, USENIX Association, 2014 (16 pages total).
B. Towles and W. J. Dally, "Guaranteed scheduling for switches with configuration overhead", IEEE/ACM Trans. Networking, vol. II, No. 5, pp. 835-847, Oct. 2003 (13 pages total).
X. Li and Hamdi, M., "On scheduling optical packet switches with reconfiguration delay", Selected Areas in Communications, IEEE Journal on , vol. 21, issue 7, pp. I 156-1164, Sep. 2003 (9 pages total).
B. Wu, K. L. Yeung, P.-H. Ho, and X. H. Jiang, "Minimum delay scheduling for performance guaranteed S\Vitches \Vith optical fabrics," J. Lightwave Technol., vol. 27, No. 16, pp. 3453-3465, Aug. 2009 (13 pages total).
Andrea Bianco; Paolo Giaccone; Emilio Leonardi; Fabio Neri; Paola Rosa Brusin, "Multi-hop scheduling for optical switches with large reconfiguration overhead", HPSR 2004 (High Performance Switching and Routing), Phoenix, AZ, USA, Apr. 2004 (5 pages total).
Alaria, V .; Bianco, A.; Giaccone, P .; Leonardi, E.; Neri, F., Multi-hop scheduling algorithms in S\Vitches \vi th reconfiguration latency ,11 High Performance S\vitching and Routing, 2006 , pp. 175-180 (6 pages total).
Zizhong Cao; Kodialam, M.; Lakshman, T.V ., 11Joint static and dynamic traffic scheduling in data center networks, INFOCOM, 2014 Proceedings IEEE , vol., No., pp. 2445 ,2453, Apr. 27, 2014-May 2, 2014 (9 pages total).

* cited by examiner

END-TO-END SCHEDULING FOR ALL-OPTICAL DATA CENTERS

CROSS-REFERENCE TO RELATED APPLICATIONS

This application claims benefit of priority to U.S. Provisional Patent Application Ser. No. 62/152,212, filed Apr. 24, 2015, entitled "End-to-End Scheduling for All-Optical Data Centers", owned by the assignee of the present application and herein incorporated by reference in its entirety.

GOVERNMENT FUNDING

This invention was made with government support under ECC-0812072 awarded by the National Science Foundation—Center for Integrated Access Networks. The government has certain rights in the invention.

BACKGROUND

An increasing array of online services and applications are provided online—from search and social networks, to entertainment and streaming video, to healthcare and government systems. Each of these applications relies on enormous amounts of data processing to provide useful content to the end user, and the underlying compute and storage infrastructure needed to support these applications are increasingly hosted in Internet data centers. Data centers may exhibit enormous scale hosting hundreds of thousands of servers.

The high cost, power demand, and complexity hinder the adoption of the full bisection bandwidth topologies, such as FatTrees, in data center networks. Data center operators instead typically rely on oversubscription to reduce network cost and power by providing a reduced quantity of bisection network bandwidth. The downside of oversubscription is poor application performance and poor server utilization, since servers have to wait for data to arrive over the congested network fabric. More recently, a number of researchers have proposed reconfigurable network topologies, such as switched optical pathways. Reconfigurable network topologies offer very high bisection bandwidth but do not require several layers of network switches as in FatTrees.

The relatively low costs of reconfigurable optical network topologies make them promising candidates for data center networks, nevertheless, there are still two main challenges for the adoption of reconfigurable optical circuits. Firstly, since reconfigurable optical circuits are inherently bufferless, data must be buffered at the source before transmission. Bufferless circuit-based networks are fundamentally different from buffered packet-switched networks. Since data transmissions cannot rely on buffers along the path, the network control plane must ensure that data is ready to send along the end-to-end circuit, with buffering only at the edge of the network. This network topology can be viewed as a single crossbar interconnecting the top of rack (ToR) switches, except that the full bisection bandwidth is not guaranteed. Specifically, due to the topology constraint, there are certain circuit configurations that could not allow all the ToR switches to transmit at the same time.

Secondly, candidate optical circuit switching technologies (such as "binary MEMS" mirror arrays) typically exhibit a reconfiguration delay when the circuit configuration is changed. This delay is a period where data cannot flow through the switch, and for practical circuit switch technologies, this reconfiguration delay is significantly longer than the link layer interframe gap. For example, the reconfiguration delay for state of the art binary MEMS is 2-20 μs, which is significantly larger than the interframe gap of 9.6 ns. This nonzero reconfiguration delay motivates the need for scheduling policies that account for the reconfiguration delay.

SUMMARY

In one aspect, this work considers the end-to-end scheduling for networks such as all-optical data centers, which have a zero in-network buffer and non-negligible reconfiguration delay. It is known that in the regime where the scheduling reconfiguration delay is non-negligible, the rate of schedule reconfiguration should be limited in such a way as to minimize the impact of reduced duty-cycles and to ensure bounded delay. However, when the scheduling rate is restricted, the existing literature also tends to restrict the rate of monitoring and decision processes. We first present a framework for scheduling with reconfiguration delay that decouples the rate of scheduling from the rate of monitoring. Under this framework, we then present two scheduling algorithms for switches with reconfiguration delay, both based on the well-known MaxWeight scheduling policy. The first one is the Periodic MaxWeight (PMW), which is simpler in computation, but requires prior knowledge of traffic load. The other is the Adaptive MaxWeight (AMW), which, in contrast, requires no prior knowledge of traffic load. We show the stability condition for both algorithms and evaluate their delay performance through simulations.

In accordance with one particular aspect of the invention, a method is provided for scheduling connections between input and output ports of a network switching arrangement over which a data packet is communicated. In accordance with the method, a schedule is initialized which specifies a sequence of time slots during each of which at least one connection is established between a specified input port and a specified output port of the network switching arrangement. A size of a queue associated with each of the connections is determined. The queues store data packets to be communicated over the respective connections. A weight of a current schedule is also determined. The weight reflects a collective size of all the queues associated with all of the connections through the network switching arrangement. A difference is determined between the current schedule and a maximum schedule having a largest weight. When the difference between the current schedule and the maximum schedule exceeds a threshold, the current schedule is changed to the maximum schedule.

DETAILED DESCRIPTION

Introduction

Figure 1:
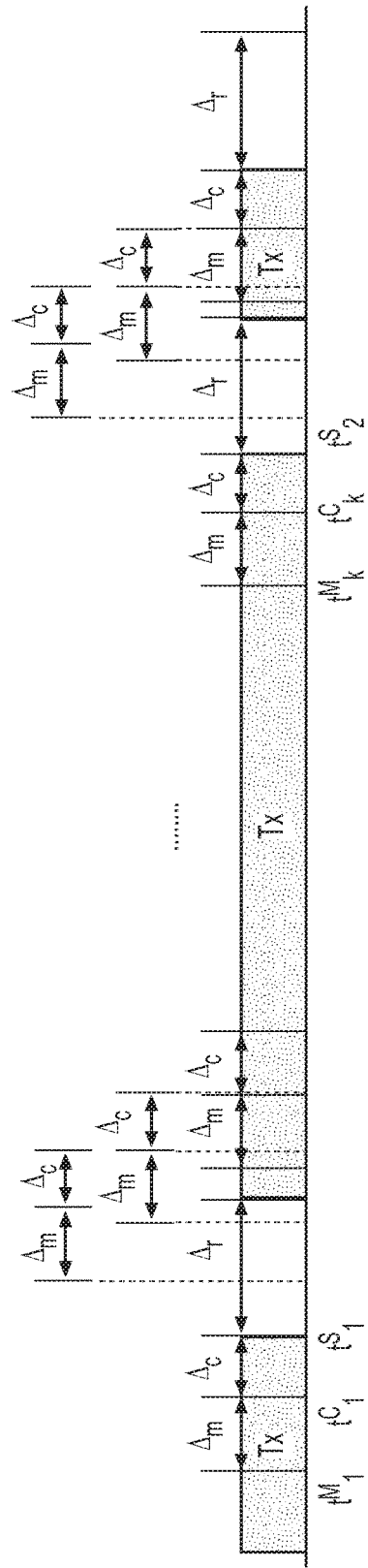
FIG. 1 is a timing diagram illustrating an example of the operation of the AMW scheduling algorithm.

As detailed below, a scheduling algorithm, referred to herein as the Adaptive MaxWeight (AMW) algorithm, is provided for network switches having a reconfiguration delay. A scheduling algorithm determines the schedule of a network switch, which specifies the connections between the input ports and the output ports of the switch. Some network switches (e.g. optical switches) may exhibit a reconfiguration delay each time the schedule of the switch is changed. This reconfiguration delay is a time period during which no packets can be delivered from the input ports to the output ports. For switches with no reconfiguration delay, a scheduling algorithm could reconfigure the schedule every unit of time (which is equal to the transmission time of a packet), hence the scheduling problem is simply to determine the most effective schedule. However, when the reconfiguration delay is non-negligible, reconfiguring the schedule too frequently would severely degrade the effective data bandwidth of the switch, and hence, as in the case addressed herein, the scheduling problem here has to balance the efficiency of the schedule with the frequency of reconfiguration. The AMW algorithm is a scheduling algorithm that optimally deals with this balance and is based solely on the information concerning the length of the queues associated with the switch.

For switch scheduling algorithms, two important performance measures are the throughput and the delay. The throughput means the percentage of the packets coming from the input ports that could be passed to the output ports. A scheduling algorithm guaranteeing 100% throughput is said to stabilize the switch, since if 100% throughput is not guaranteed, then some queues of the switch will grow without bound. On the other hand, the delay performance is usually assessed by the mean delay of the packets delivered by the switch or the mean queue length of the switch (which is proportional to the mean delay).

Existing scheduling algorithms for data switches with reconfiguration delay require knowledge of the statistics of the packet arrival at each queue (e.g., mean arrival rate) in order to ensure 100% throughput. The AMW algorithm on the other hand, ensures 100% throughput without requiring any knowledge of the arrival traffic. The AMW algorithm also outperforms existing scheduling algorithms for switches with reconfiguration delay in terms of the delay performance. In order to accommodate the overhead due to the reconfiguration delay, existing algorithms have to provision the time between two schedule reconfigurations to be long enough to ensure stability. However, the schedule could become ineffective before the next reconfiguration time, and hence would be suboptimal in terms of its delay performance. In contrast, the AMW algorithm adaptively selects the schedule reconfiguration time by continuously monitoring the state of the queues, and hence it is able to achieve the optimal balance between the efficiency of the schedule and the frequency of schedule reconfigurations.

In a N×N network switch, each input port i maintains N virtual output queues (VOQs). Let Qij denote the VOQ maintained by the input port i, storing the packets destined for output port j. The AMW algorithm continuously monitors information concerning the size of the queues (such as the queue lengths, or the waiting time of the first packets in the queues) and makes scheduling decisions. Assume that time is divided into time slots, where each slot is equal to the transmission time of one packet (along with the assumption that all the packets are of the same size). Let the queue length of the VOQ Qij at time t be Lij(t). Let S(t)=[Sij(t)] be the schedule of the switch at time t, indicating the connections between the input ports and output ports. Sij(t)=1 if the input port i is connected to output port j, and Sij (t)=0 if the input port i is not connected to output port j. A fundamental constraint on any available schedule is that each input may connect to at most one output, and each output may connect to at most one input in a schedule. That is, $$\sum_{i=1}^{N} S_{ij} \le 1, \sum_{j=1}^{N} S_{ij} \le 1.$$

We denote the set of available schedules as F.

For each available schedule S, we define the weight of a schedule at time t as $$\langle S, L(t) \rangle = \sum_{i=1}^{N} \sum_{j=1}^{N} S_{ij} L_{ij}(t).$$

The AMW scheduler monitors the queue lengths every time slot t to get the queue length matrix at time t, L(t)= [Lij(t)]. Suppose the schedule used at time t−1 is S=S(t−1), then the scheduler first computes the weight of the (current) schedule S, which is w(t)=⟨S,L(t)⟩, and compares it to the weight of some maximum weight schedule (we call it the maximum weight), which is $$w^*(t) = \max_{S'} \langle S', L(t) \rangle.$$

In one embodiment we set a threshold as a sublinear function such as $\sigma(t)=(1-\gamma)(w^*(t))^{1-\delta}$. If the difference between the maximum weight and the current weight is too large, that is, if w*(t)−w(t)>σ(t), then a schedule change is performed, changing the schedule to the maximum weight schedule. If (w*(t)−w(t)≤σ(t)), then the scheduler does not perform a schedule reconfiguration.

Figure 5:
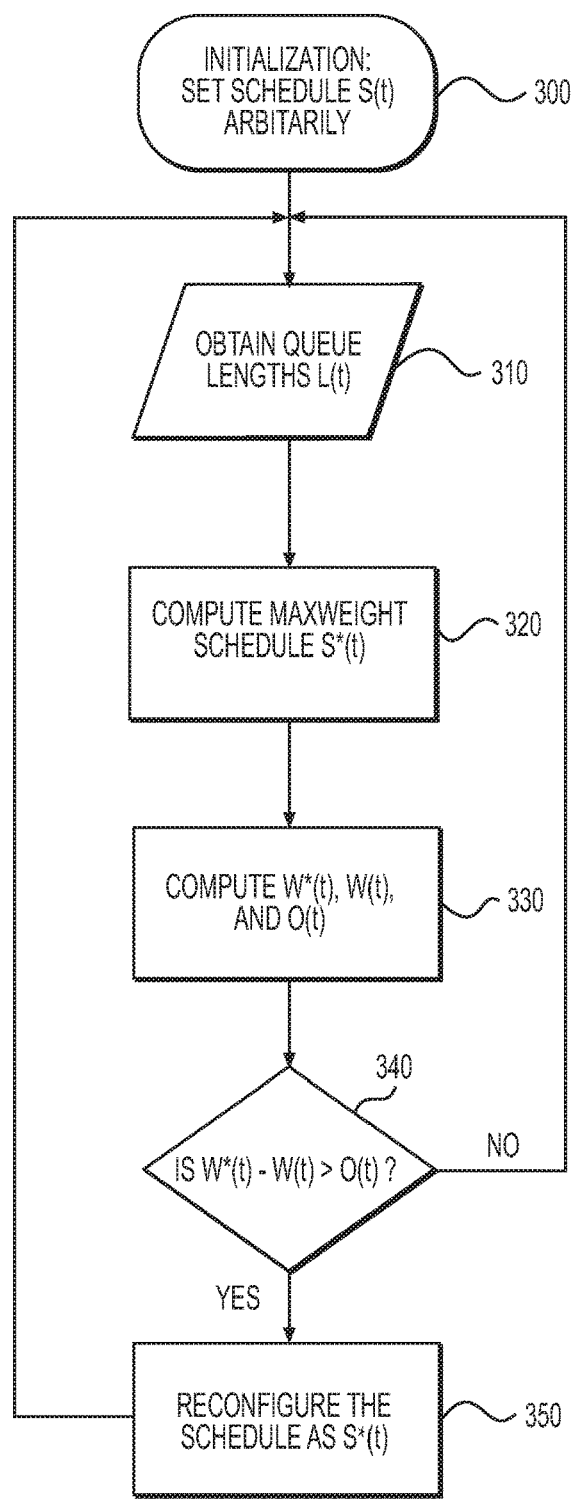
FIG. 5 is a flowchart showing one example of the Adaptive MaxWeight (AMW) algorithm, which determines the schedule reconfiguration instances.

FIG. 5 is a flow chart showing one example of the AMW scheduling algorithm. The process begins at step 300 when a schedule is initialized. The schedule specifies a sequence of time slots during each of which at least one connection is established between a specified input port and a specified output port of the network switching. Next, at step 310 the length of the queue associated with each of the connections is determined and the maximum weight schedule having the maximum weight is determined in step 320. In addition, the weight of the current schedule is determined in step 330, along with the threshold specified above. The difference between the current schedule and the maximum schedule is calculated in step 340. If the difference between the current schedule and the maximum schedule exceeds the threshold value, the current schedule is changed to the maximum schedule in step 350. The process then repeats by returning to step 310.

In general, besides the reconfiguration delay, there are also delays associated with the monitoring and schedule computation, which are denoted as $\Delta_m$ and $\Delta_c$, respectively. FIG. 1 is a timing diagram illustrating an example of the operation of the AMW scheduling algorithm. The scheduler continuously monitors the queue lengths and performs a computation to determine if a schedule reconfiguration is required. When the weight difference is larger than the threshold, the schedule is reconfigured, which is followed by a reconfiguration delay in which no packets are sent. For instance, in FIG. 1 first transmission interval Tx extends up to a time $t_1^S$ at which a schedule change is performed. During the transmission interval the connections specified by the current schedule are established. The schedule change is immediately followed by a reconfiguration delay $\Delta_r$, after which a second transmission interval Tx begins. The second transmission interval ends at a time $t_1^S$, at which time the schedule is once again changed. As shown, queue monitoring and computation of a new schedule are performed during each transmission period.

One direct application of the AMW algorithm is to schedule optical switches. Optical switches have advantages over electronic switches based on cost, power consumption, and the data bandwidth provided. With the advancement of dense wavelength-division multiplexing (DWDM), the supported data bandwidth of optical switches can easily scale up. However, the non-negligible reconfiguration delay of optical switches imposes a great challenge on their scheduling. Due to physical constraints, current optical switch technologies exhibit reconfiguration delays ranging from microseconds to milliseconds in scale, which is considerably greater than the transmission time of a packet (which is generally less than a nanosecond). Even if the reconfiguration delay could be decreased with the advancement of optical switch technologies, as the data bandwidth increases, the reconfiguration delay would still be non-negligible compared to the transmission time of a packet. The AMW algorithm accommodates the problem of reconfiguration delay and provides not only ensures stability, but also achieves optimal delay performance compared to existing techniques.

In addition to scheduling individual switches, another application of the AMW algorithm is to schedule a circuit switched network with a non-negligible circuit setup time. One example of such a network is a network comprised of optical switches. Since buffering in optical domain is extremely expensive, an optical network is inherently bufferless. If we treat the edge of this circuit switched network as the input/output ports of a switch, the entire network may be viewed as a single switch. We may then utilize the AMW algorithm to perform scheduling for the entire network. This idea enables the possibility of an all-optical network and would facilitate the adoption of optical switches.

The following discussion with further describe the AMW algorithm in more detail. For purposes of illustration and not as a limitation on the subject matter described herein the AMW algorithm will be described in the context of an optical switch network, and more particularly to an optical switch network that interconnects top of rack (ToR) switches such as employed in data centers. The ToR switches can be treated as the input and output ports of a switching arrangement for purposes of scheduling using the AMW algorithm.

System Model

A. Optical Switch Network

Figure 2:
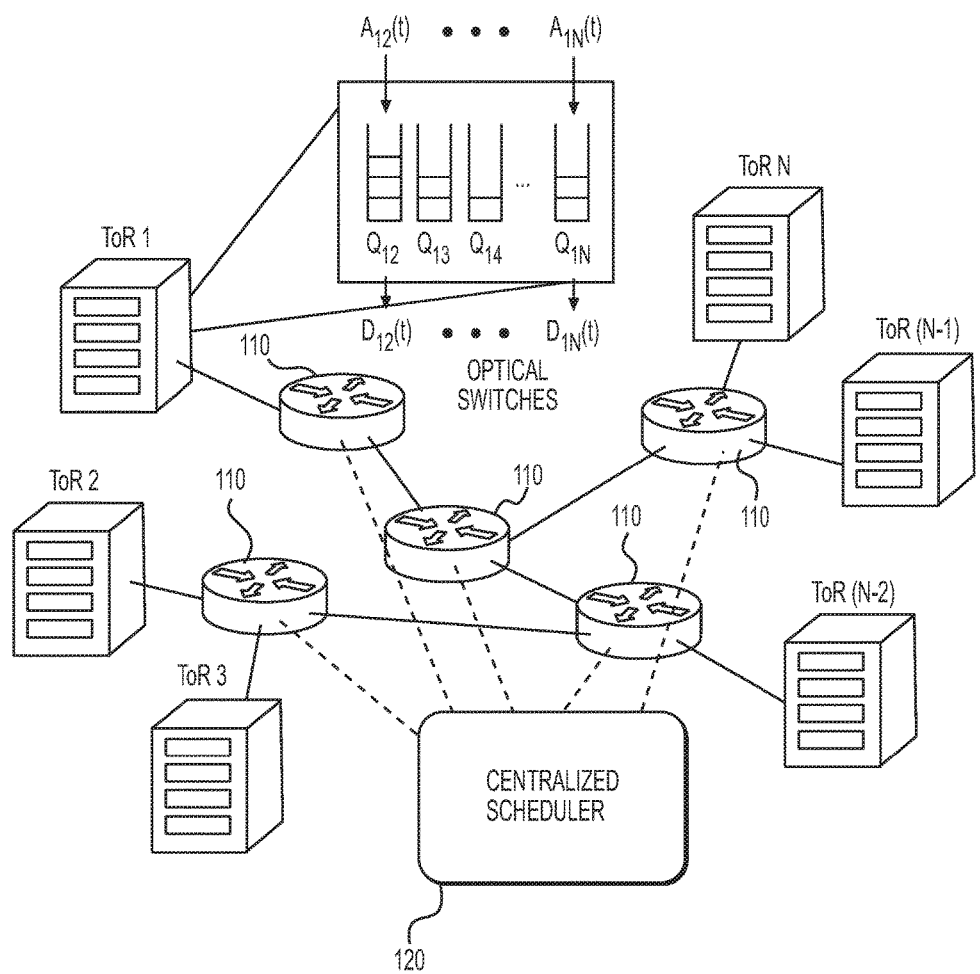
FIG. 2 shows one example of the system model.

As shown in FIG. 2, we consider a set of N top of rack (ToR) switches, labeled by $\{1, 2, \ldots, N\}$, which are interconnected by an optical switched network that includes switches 110. Each ToR switch can serve as a source and a destination simultaneously. We assume no buffering in the optical network, hence all the buffering occurs in the edge of the network, i.e. within the ToR switches. Each ToR switch maintains N−1 edge queues (either physically or virtually), which are denoted by $Q_{ij}$, where $j \in \{1, 2, \ldots, N\}\setminus\{i\}$. Packets going from the ToR switch i to j are enqueued in the edge queue $Q_{ij}$ before transmission.

The system considered is assumed to be time-slotted, with the time indexed as $t \in \mathbb{N}_+ = \{0, 1, 2, \ldots\}$. Each slot duration is the transmission time of a single packet, which is assumed to be a fixed value. Let $A_{ij}(t)$ and $D_{ij}(t)$ be the number of packets arrived at and departed from queue $Q_{ij}$ at time t, respectively. Let $L_{ij}(t)$ be the number of packets in the edge queue $Q_{ij}$ at the beginning of the time slot t. For ease of notation, we set $A_{ii}(t)=D_{ii}(t)=L_{ii}(t)=0$ for all t and write $A(t)=[A_{ij}(t)]$, $D(t)=[D_{ij}(t)]$, $L(t)=[L_{ij}(t)]$, where $A(t)$, $D(t)$, $L(t) \in \mathbb{N}_+^{N \times N}$.

We assume the arrival processes $A_{ij}(t)$ to be independent over $i,j \in \{1, 2, \ldots, N\}$, $i \neq j$. Each process $A_{ij}(t)$ is i.i.d. over time slots. We also assume that $A_{ij}(t)$ has a finite support, i.e. $\exists K < \infty$ such that $A_{ij}(t) \leq K$. We call the mean of $A_{ij}(t)$ as the traffic rate $\lambda_{ij} = \mathbb{E}\{A_{ij}(0)\}$, and define the traffic rate matrix as $\lambda = [\lambda_{ij}] \in \mathbb{R}^{N \times N}$.

Let $S(t) \in \{0,1\}^{N \times N}$ denote the schedule at time t, which indicates the optical circuits established between the ToR switches. A centralized scheduler 120 monitors the size of the edge queues, calculates new schedules and causes the schedules to be reconfigured. We set $S_{ij}(t)=1$ if an optical circuit from ToR i to j exists at time t, and $S_{ij}(t)=0$ for all t and $i \in \{1, 2, \ldots, N\}$. We also assume at any t each ToR can only transmit to at most one destination, and can only receive from at most one source, i.e. $\Sigma_i S_{ij}(t) \leq 1, \Sigma_j S_{ij}(t) \leq 1$. The feasible schedules for the network are determined by the network topology, and we let $\mathcal{F}$ denote the set of all feasible schedules, i.e. $S(t) \in \mathcal{F}$ for all t. Note that if a schedule S contains N circuit connections, then S is a permutation matrix. Furthermore, if all such schedule is in the feasible schedule set $\mathcal{F}$, we say the network topology is non-blocking.

B. Stability and Capacity Region

An edge queue $Q_{ij}$ is strongly stable if its queue length $L_{ij}(t)$ satisfies:

$$\limsup_{t \to \infty} \frac{1}{t} \sum_{\tau=1}^{t} \mathbb{E}\{L_{ij}(\tau)\} < \infty$$

and we say the system of queues is stable if $Q_{ij}$ is strongly stable for all $i,j \in \{1, 2, \ldots N\}$, $i \neq j$. A scheduling policy is said to stabilize the system if the system is stable under that scheduling policy. With this notion of stability, we define the capacity region $\mathcal{C}$ of the network as the set of all traffic rate matrix such that there exists a scheduling policy which stabilizes the system.

The capacity region is given by the interior of the convex hull of the feasible schedules $\mathcal{F}$ see L. Tassiulas and A.

Ephremides, "Stability properties of constrained queueing systems and scheduling policies for maximum throughput in multihop radio networks," *Automatic Control, IEEE Transactions on*, vol. 37, pp. 1936-1948, December 1992), that is $$C = \left\{ \sum_{S \in \mathcal{F}} \alpha_S S : \sum_{S \in \mathcal{F}} \alpha_S < 1, \alpha_S \geq 0, \forall S \in \mathcal{F} \right\}$$

For any traffic rate matrix $\lambda \in \mathcal{C}$, we say that $\lambda$ is admissible, and define the load of the traffic as $\rho(\lambda) = \max\{r: \lambda \in r \bar{\mathcal{C}}, 0 < r < 1\}$, where $\bar{\mathcal{C}}$ is the closure of $\mathcal{C}$.

We say that a scheduling policy achieves 100% throughput if it stabilizes the system of edge queues under any admissible traffic.

C. Timing Parameters

One of the main attributes of our work is to identify three distinct time sequences associated with monitoring, computation, and schedule reconfiguration.

Definition 1. Let $\{t_k^M\}_{k=1}^{\infty}$ denote the time instances that the state of edge queues are uploaded to the centralized scheduler. Specifically, the information available at the scheduler is a subset of the edge queue lengths $\{L(t_k^M)\}_{k=1}^{\infty}$.

Definition 2. Let $\{t_k^C\}_{k=1}^{\infty}$ denote the time instances when a set of new schedules are computed. A scheduler could generate one schedule or multiple schedules, which depends on the scheduling policy used.

Definition 3. Let $\{t_k^S\}_{k=1}^{\infty}$ denote the time instances when the schedule is reconfigured. The schedule between two schedule reconfiguration time instances remains the same, i.e.

$$S(\tau) = S(t_k^S), \forall \tau \in [t_k^S, t_{k+1}^S - 1]$$

Each of the three processes is associated with a delay as described below.

Definition 4. Let $\Delta_m$ be the delay of the monitoring process. This means that the edge queue lengths at time $t_k^M, L(t_k^M)$, is available at the scheduler after time $t_k^M + \Delta_m$. Therefore, at any time instance t, the edge queue lengths information available at the scheduler is the set $\{L(\text{thd } k^M)\}_{k=1}^n$, where $n = \max\{k: t_k^M + \Delta_m < t\}$.

Definition 5. Let $\Delta_c$ be the delay of the computation process of the scheduler generating a set of new schedules. This means that the schedules computed at time $t_k^C$ are available (could be used) after time $t_k^C + \Delta_c$.

Definition 6. Let $\Delta_r$ be the reconfiguration delay associated with establishing a new schedule across the network. During the period of schedule reconfiguration, no packet transmission could occur in the network. This means that $\forall i, j \in \{1, 2, \ldots N\}, \forall k \in \mathbb{N}_+$, and $0 \leq \tau \leq \Delta_r$, we have $D_{ij}(t_k^S + \tau) = 0$.

These timing parameters restrict the scheduling algorithms from using spontaneous edge queue information. For example, the beginning of a schedule at time t, S(t), is actually being reconfigured at time $t - \Delta_r$. The computation of this schedule began at time $t - \Delta_r - \Delta_c$, and the computation is based on information of edge queues at time $t - \Delta_r - \Delta_c - \Delta_m$. In this work, we are primarily interested in the case of $\Delta_c, \Delta_m \approx 0$, $\Delta_r > 0$, even though in Section VI, we will briefly discuss the impact of $\Delta_m > 0$ via simulations.

II. Related Work

An alternative to MaxWeight policy, some prior work in the area of switch scheduling rely on the Birkhoff and von Neumann (BvN) theorem (see G. Birkhoff, "Tres observaciones sobre el algebra lineal," *Univ. Nac. Tucuman Rev. Ser. A5*, no. 147-150, 1946) to construct a scheduling policy with 100% throughput. The BvN theorem states that any admissible doubly stochastic matrix can be decomposed as a convex combination of permutation matrices. As discussed in C.-S. Chang, W.-J. Chen, and H.-Y. Huang, "Birkhoff-von neumann input buffered crossbar switches," in *INFOCOM 2000. Nineteenth Annual Joint Conference of the IEEE Computer and Communications Societies. Proceedings. IEEE*, vol. 3, pp. 1614-1623 vol. 3, March 2000, ("Chang"), the BvN scheduling policy assumes the knowledge of the arrival statistics and relies on a BvN decomposition of arrival rate matrix into a set of schedules. The scheduler ensures queue stability by ensuring each schedule in the set is served for an appropriate time interval proportional to the BvN decomposition coefficients.

While BvN scheduler of Chang indeed ensures queue stability for ergodic admissible arrivals, the delay performance can be significantly worse than that of the Max-Weight policy. This performance degradation gets worse with the number of ToR switches: while the delay under the MaxWeight scheduler has an upper bound of O(N), any open loop policy, including the BvN policy of Chang, which assigns schedules independent of the queue states is shown to result in delay that has a lower bound of O(N). As a result, in our work we have restricted our attention to the class of closed loop policies. A closed loop scheduling policy based on BvN decomposition is proposed in G. Porter, R. Strong, N. Farrington, A. Forencich, P. Chen-Sun, T. Ros-ing, Y. Fainman, G. Papen, and A. Vandat, "Integrating microsecond circuit switching into the data center," in *Proceedings of the ACM SIGCOMM 2013 Conference on SIGCOMM, SIGCOMM '13*, (New York, N.Y., USA), pp. 447-458, ACM, 2013 ("Porter"). This proposed traffic matrix scheduling (TMS) policy falls in the class of fixed batch scheduling policies proposed in K. Ross and N. Bambos, "Adaptive batch scheduling for packet switching with delays," in *High-performance Packet Switching Architectures* (I. Elhanany and M. Hamdi, eds.), pp. 65-79, Springer London, 2007 ("Ross") in the context of switching with non-negligible reconfiguration delay, $\Delta_r > 0$. The TMS and fixed batch policies periodically monitor the edge queue (ToR queue) lengths to account for outstanding packets accumulated up to any given scheduling time. The number of outstanding packets in the ToR queues are normalized to generate a fixed number of schedules (according to BvN decomposition) to be used in the pre-specified period till the next monitoring/computation time instance. When necessary, the TMS policy has also been combined with packet switching over an electronic switched network, as suggested in Porter.

Figure 3A:
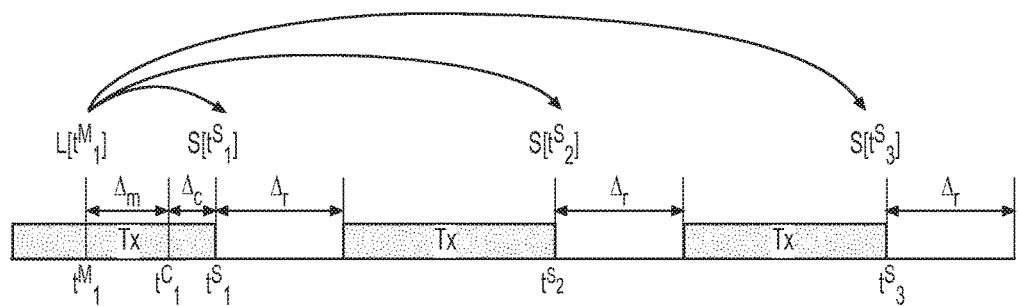
FIG. 3(a) shows a timing diagram for a scheduling strategy that employs quasi-static monitoring and FIG. 3(b) shows a timing diagram for a scheduling strategy that employs active monitoring.
Figure 3B:
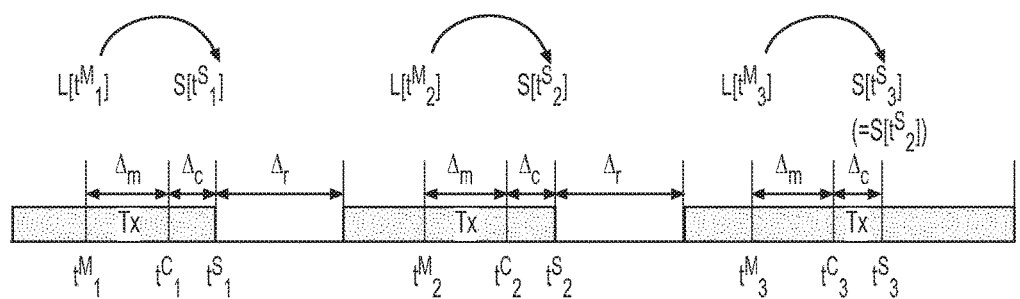

The scheduling policies in Porter and Ross both involve "quasi-static monitoring": selecting series of schedules based on a single schedule computation process. When monitoring and computation times are identically coupled, generated schedules may depend on very outdated information, as shown in the timing diagram of FIG. 3(a) for a quasi-static monitoring scheme such as the traffic matrix scheduling policy described below in which a schedule computation is performed at times denoted $t_1^S, t_2^S, t_3^S$, and so on, which are separated by a predetermined time interval. In contrast, we have found that it can be beneficial to employ "active monitoring" schedules that are determined based on frequent and up-to-date queue information, as shown in the timing diagram of FIG. 3(b). That is, in FIG. 3(b) each schedule is computed based on the most up-to-date queue information.

In this work, we show that decoupling the monitoring and scheduling rates allow for active monitoring, resulting in significant improvements. In particular, we show that rather than pre-selecting a set of schedules, and hence a fairly tardy queue monitoring, it is advantageous to allow for "active monitoring" and "frequent computations". In the following sections, we propose active monitoring policies, namely the PMW and AMW policies, and analyze their stability and delay performance.

Secondly, to account for the non-negligible reconfiguration delay, hence the loss in the duty cycle, the prior work either rely on the explicit traffic statistics or a conservative upper bound to restrict the rate of schedule reconfigurations. In contrast, the adaptive scheduling algorithm described herein ensures that schedule reconfigurations occur at optimized time instances.

III. Scheduling Policies

In this section we introduce three scheduling policies. Under the first two policies, the monitoring time instances are selected such that $t_k^M = kT$, $k \in \mathbb{N}_+$, where T would be the mean schedule duration and is selected appropriately. The difference of the two scheduling policies is in the choice of the computation time instances $\{t_k^C\}$. Under the Traffic Matrix Scheduling (TMS), first introduced in Porter and discussed in subsection IV-A, schedules are computed in a batch such that $t_k^C = kqT = t_{kq}^M = t_{kq}^S$ for a preselected parameter q; while Periodic MaxWeight (PMW) relies on active monitoring to make computation of one schedule at each monitoring time, i.e. $t_k^C = t_k^M = t_k^S$. As we will see in sections V and VI, both TMS and PMW policies require that the selection of the parameter T be dependent on arrival statistics. In contrast, the third scheduling policy, the Adaptive MaxWeight, adaptively selects $\{t_i^S\} \subset \{t_k^M\} = \{t_k^C\}$ in a manner to ensure stability and optimized queue lengths.

A. Traffic Matrix Scheduling

In this subsection we briefly describe the traffic matrix scheduling (TMS) policy in Porter, which would be a benchmark comparison to our proposed policies. The TMS policy is based on Birkhoff von-Neumann (BvN) Theorem that every doubly stochastic matrix could be decomposed as a convex combination of permutation matrices. The scheduler makes schedule computation every qT slots, where T is the selected mean schedule duration, and q be the number of schedules used between two schedule computation time instances. At the computation time instances $t_k^C = t_{kq}^M$, the scheduler takes the edge queue length matrix $L(t_{kq}^M)$ and scales it to a doubly stochastic matrix $B(t_{kq}^M)$ which indicates the relative service requirement in the following qT slots. The scheduler then performs a BvN decomposition (see Chang) on $B(t_{kq}^M)$:

$$B(t_{kq}^M) = \sum_{i=1}^{Q} \alpha_i P_i$$

where each $P_i$ is a permutation matrix, and is a schedule that would be served for $\alpha_i qT$ slots within the following qT slots. Depending on the demand $B(t_{kq}^M)$, the number of terms Q in the decomposition may vary ($Q \leq N^2 - 2N + 2$). In practice, we select q largest weighted schedules to avoid excessive schedule changes. Rearrange the order in the decomposition so that $\{\alpha_i\}_{i=1}^q$ are the q largest coefficients. The coefficients are then scaled proportionally to $\tilde{\alpha}_i = \alpha_i / \Sigma_{i=1}^q \alpha_i$, $i=1, \ldots, q$.

B. Periodic MaxWeight

The timing sequeces in the PMW policy are selected as $t_k^M = t_k^C = t_k^S = kT$, $k \in \mathbb{N}_+$. The PMW policy computes a schedule at time instance $t_k^C$ based on the edge queue lengths $L(t_k^M)$. The schedule for time $t_k^S$ is selected as $$S(t_k^S) = S^*(t_k^M) = \underset{S \in \mathcal{F}}{\text{argmax}} \langle S, L(t_k^M) \rangle$$

where $S^*(t_k^M) = \langle S, L(t_k^M) \rangle = \Sigma_{i,j=1}^N S_{ij} L_{ij}(t_k^M)$ is the weight of a schedule S at time t. We call $S^*(t_k^M)$ the MaxWeight schedule at time $t_k^M$. The scheduler then reconfigures the schedule at time $t_k^S$, $S(t_k^S) = S^*(t_k^M)$.

Figure 4A:
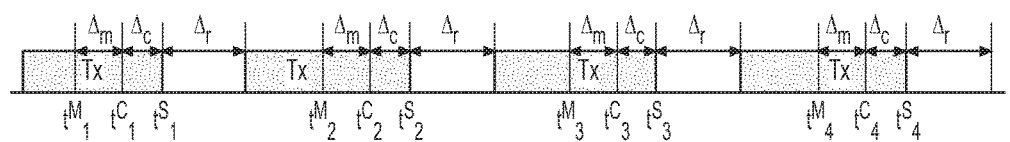
FIG. 4(a) shows a timing diagram for periodic scheduling and FIG. 4(b) shows a timing diagram for adaptive scheduling.

FIG. 4a shows a timing diagram for the PMW scheduling policy in which the period between schedule updates is determined in advance for a number of different schedules.

C. Adaptive MaxWeight

The PMW policy stabilizes any feasible traffic as long as the traffic load is known, as would be shown in the next section. However, in terms of the delay performance, it is not hard to see that the PMW policy might suffer from its periodic schedule update behavior. The schedule may become inefficient before the next reconfiguration time. This would then degrade the throughput of the current schedule.

Figure 4B:
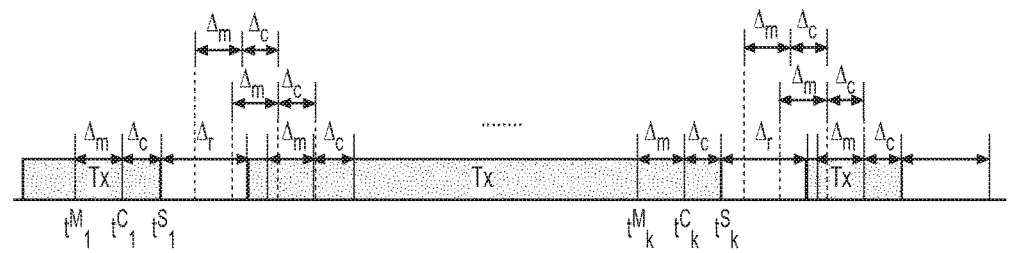

Based on this observation, we propose the Adaptive MaxWeight (AMW) algorithm, which determines the schedule reconfiguration instances, hence their rate, adaptively (based on instantaneous edge queue information), as shown in the timing diagram of FIG. 4(b) and the flowchart of FIG. 5. In AMW, the scheduler initializes the schedule S(t) (step 300 in FIG. 5) and continuously monitors the edge queues (step 310 in FIG. 5) and makes a MaxWeight computation (step 320 in FIG. 5) based on edge queue lengths $L(t_k^M)$. In one embodiment the MaxWeight computation is performed at every time slot $t_k^C$. In particular, the scheduler computes the weight of the MaxWeight schedule $$w^*(t_k^M) = \max_{S \in \mathcal{F}} \langle S, L(t_k^M) \rangle.$$

and the weight of the current schedule (step 330 in FIG. 5):

$$w(t_k^M) = \langle S(t_k^M), L(t_k^M) \rangle.$$

The AMW algorithm keeps track of the difference $\Delta w(t_k^M) = w^*(t_k^M) - w(t_k^M)$ (step 340 in FIG. 5) and compares it with a threshold, which in one embodiment is a sublinear function such as $\sigma(t_k^M) = (1-\gamma)(w^*(t_k^M))^{1-\delta}$ (step 340 in FIG. 5), where the ratio threshold $\gamma \in (0, 1)$ and the sublinear exponent $\delta \in [0, 1)$ are predetermined system parameters. If $\Delta w(t_k^M)$ is larger than the threshold $\sigma(t_k^M)$, then the scheduler decides to change the schedule to the MaxWeight schedule (step 350 in FIG. 5); otherwise keeps the current schedule. Therefore, the schedule reconfiguration time instance $t_l^S$ is given by $$t_l^S = \min\{t_k^M : t_k^M > t_{l-1}^S, \Delta w(t_k^M) > \sigma(t_k^M)\}$$

and the schedule is reconfigured at time $t_l^S$ as $$S(t_l^S) = \underset{S \in \mathcal{F}}{\text{argmax}} \langle S, L(t_k^M) \rangle$$

where $t_k^M$ is the monitoring time instance that corresponds to the schedule reconfiguration time $t_l^S$.

Notice under the Adaptive MaxWeight the times to perform schedule reconfiguration are not limited to the multiples of T, which had to be chosen with some knowledge of $\Delta_r$ and traffic load. Instead the schedule reconfigurations can occur sooner or later depending on the current state of the system, which in turn is a result of the prior effective switching rate. The proposed AMW policy relies on the fact that we have decoupled the restrictions on the decision process (monitoring and computation) from the restriction on the action process (reconfiguration). We provide theoretical guarantees on throughput optimality of the AMW policy in section V. In section VI we investigate the delay performance of the proposed scheduling policies empirically.

IV. Stability Analysis

In this section we analyze the stability of the proposed scheduling policies, the PMW and AMW policies. The reconfiguration delay is assumed to be nonzero, i.e. $\Delta_r>0$, while the monitoring and computation delay are assumed to be negligible, $\Delta_m=\Delta_c=0$. We consider the irreducible discrete time Markov chain (DTMC) process describing the evolution of edge queue occupancies L(t) and prove that it satisfies the Foster Lyapunov Theorem (see Appendix).

A. Periodic MaxWeight

Due to the overhead that incurred by the reconfiguration time $\Delta_r$, the duty cycle of the PMW algorithm with schedule reconfigure period T can be determined as $$1 - \frac{\Delta_r}{T}.$$

Theorem 1 establishes that given an admissible traffic load ρ, the PMW algorithm guarantees stability as long as the schedule reconfigure period T satisfies $$1 - \frac{\Delta_r}{T} > \rho \left( \text{or equivalently, } T > \frac{\Delta_r}{1-\rho} \right).$$

Theorem 1. Given an admissible traffic λ with load ρ(λ)<1 and the reconfiguration delay $\Delta_r$. If the schedule reconfigure period of the PMW policy satisfies $$T > \frac{\Delta_r}{1-\rho},$$

then the PMW policy strongly stabilizes the edge queues.

The proof is given in appendix A.

B. Adaptive MaxWeight

In the AMW algorithm, schedule changes do not necessarily occur at the beginning of each interval $[t_k, t_{k+1}]$. Instead, as the queue occupancies grow, the time between two schedule reconfigurations may in general increases. In other words, a drop in duty cycle would delay the packets and create a large queue; this increase in queue size is then fed back to increase the threshold σ(t) and hence reduce the rate of reconfigurations. We then utilize this observation to establish a lower bound for the time between two schedule reconfigurations and derive the stability. Additionally, the AMW policy has the advantage that during low load periods, it reconfigures the MaxWeight scheduling at a higher reconfiguration rate, resulting in a better delay performance.

Theorem 2. For any admissible traffic load ρ, if the ratio threshold γ∈(0,1) and the sublinear exponent δ∈(0,1), then the AMW policy strongly stabilizes the edge queues.

The proof is given in appendix B.

Finally, notice that we omitted $\Delta_m$ and $\Delta_c$ in the proof of stability. Referring to the proof of stability under MWM with a fixed delay in A. Mekkittikul and N. McKeown, "A practical scheduling algorithm to achieve 100% throughput in input-queued switches," in *INFOCOM '98. Seventeenth Annual Joint Conference of the IEEE Computer and Communications Societies. Proceedings. IEEE*, vol. 2, pp. 792-799, March 1998, we claim that when $\Delta_m$ and $\Delta_c$ are fixed values, the stability results proved in this section can be trivially generalized.

V. Performance Evaluation

In this section we present simulation results for the proposed PMW and AMW policies, and compare them to the benchmark scheduling policy TMS. The experiments are conducted with the simulator built for the REACToR switch in H. Liu, F. Lu, A. Forencich, R. Kapoor, M. Tewari, G. M. Voelker, G. Papen, A. C. Snoeren, and G. Porter, "Circuit switching under the radar with reactor," in *Proceedings of the 11th USENIX Conference on Networked Systems Design and Implementation*, NSDI'14, (Berkeley, Calif., USA), pp. 1-15, USENIX Association, 2014 ("Liu"). The reconfiguration delay is $\Delta_r=20$ µs. In order to compare scheduling policies in optical switches, we cease the electronic switches in the hybrid switch design in Liu and only utilize the optical switches. We consider N=100 ToR switches, and the network topology is assumed to be non-blocking. Therefore, the set of feasible schedules F is in fact the set of N×N permutation matrices. Each link has data bandwidth of B=100 Gbps, and the packets are of the same size p=1500 bytes (each takes 0.12 µs for transmission). Each edge queue can store up to $1 \times 10^5$ packets, and incoming packets are discarded when the queue is full.

The traffic is assumed to be admissible, i.e. ρ(λ)<1, while the load matrices λ used in this section are classified to the following types:

1) Uniform: $\Delta_{ij}=\rho/N$, $\forall 1=i,j=N$.
2) Nonuniform:

$$\lambda_{ij} = \frac{\rho}{M} \sum_{m=1}^{M} P_{ij}^m$$

where $P^m$, m=1, ..., M∈$\mathcal{P}$ are permutation matrices picked at random. The number M determines the skewness of the load matrix. We set M=100 here.

The performance measure used is the mean edge queue length (averaged over queues and over time). Notice that the expected average delay in this system is linearly related to the this quantity according to the Little's law.

Figure 6:
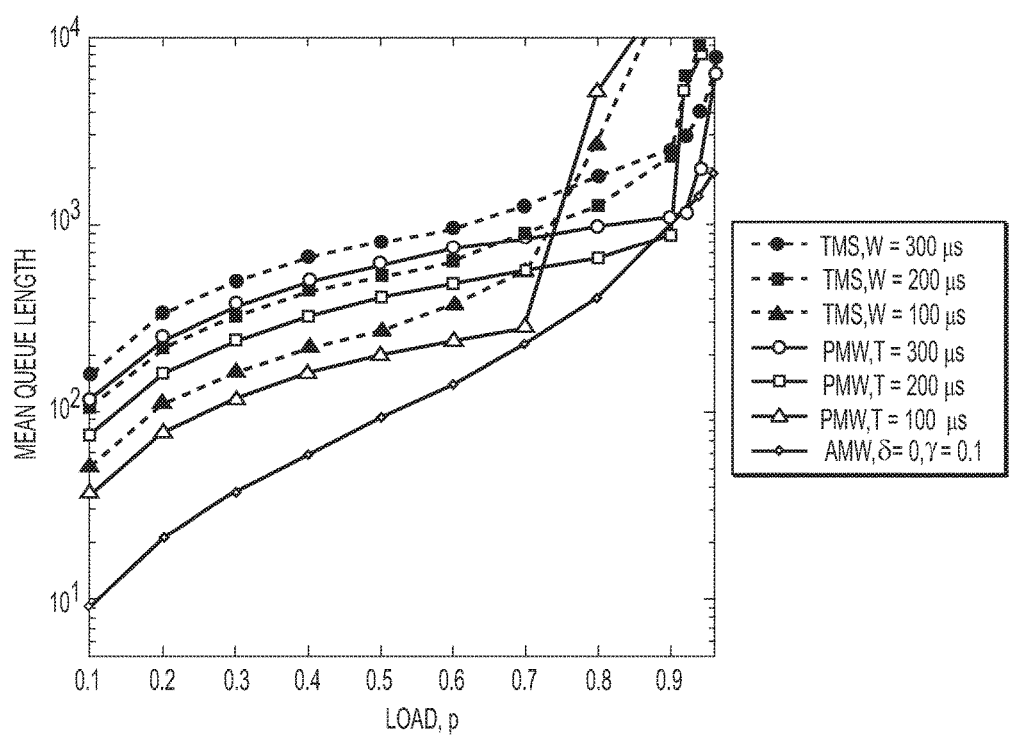
FIG. 6 is a graph showing the mean queue length versus traffic load ρ under uniform traffic.
Figure 7:
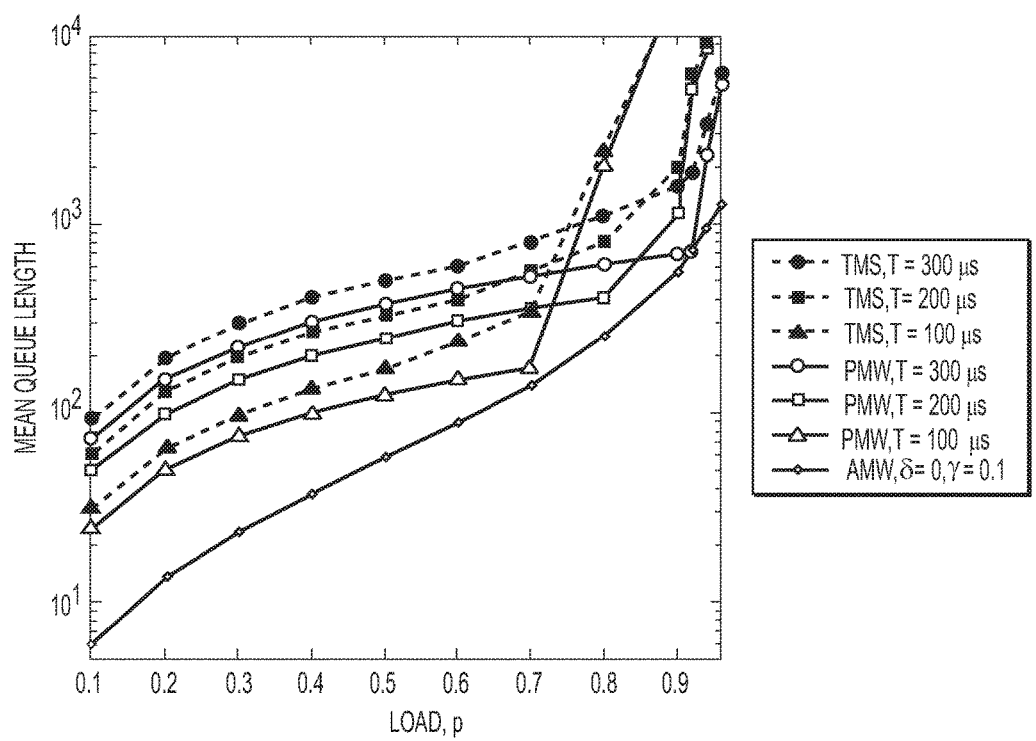
FIG. 7 is a graph showing the mean queue length versus traffic load ρ under nonuniform traffic.

In FIGS. 6 and 7, we show performance comparison of the three scheduling algorithms described in section IV under the uniform and the nonuniform traffic, respectively. For TMS, we set the number of schedules used between two schedule computation time instances to be q=10. In FIGS. 6 and 7 we can see that the TMS and PMW perform comparably with the PMW slightly outperforming the TMS under the same schedule reconfiguration rate 1/T. We note that under both the TMS and PMW policies, the traffic loads they could stabilize are determined by the reconfiguration rate 1/T. In general, a smaller T value gives better delay performance at a fixed load, but choosing a smaller T value also decreases the maximum load that the TMS or PMW policy could stabilize. On the other hand, the AMW policy always outperforms the PMW and TMS.

Figure 8:
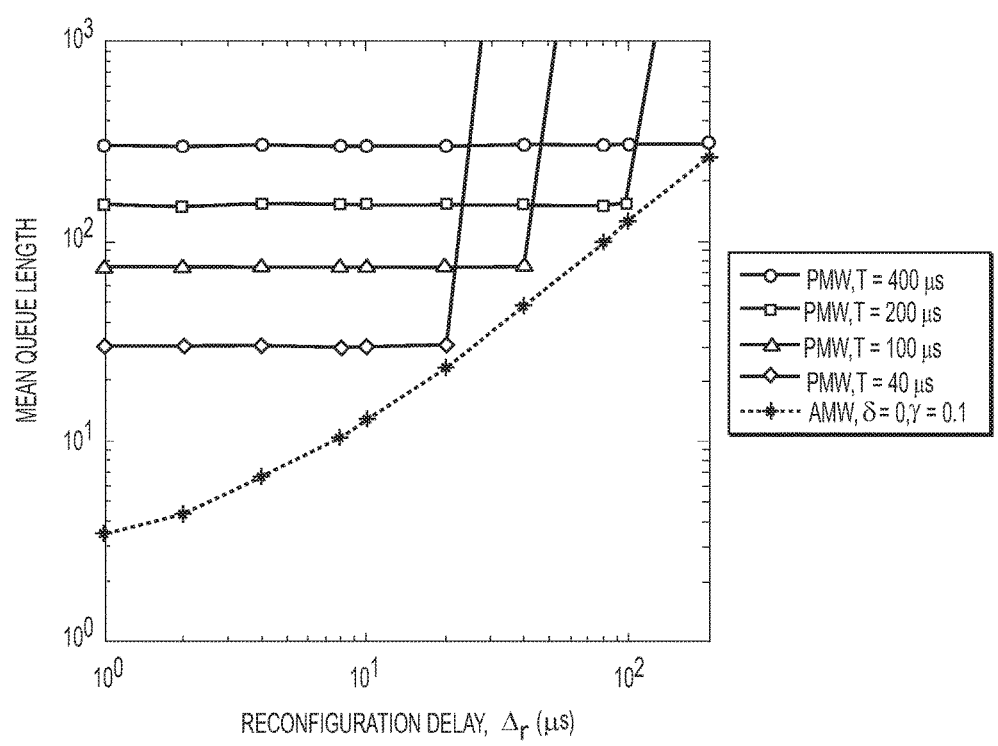
FIG. 8 is a graph shows the mean queue length versus the reconfiguration delay $\Delta_r$ under nonuniform traffic assuming negligible monitoring and computation delay.

We now consider the effect of the reconfiguration delay $\Delta_r$ to the performance. In FIG. 8, we show the performance of the PMW and AMW under various $\Delta_r$, while the traffic load is fixed as $\rho=0.3$. We can see that the performance of the AMW outperforms the PMW under each $\Delta_r$ value, regardless of the parameter selection of the PMW policy. Although there exists an optimal schedule reconfiguration period T of the PMW policy that achieves comparable performance to the AMW policy at each $\Delta_r$, the choice of the optimal T is dependent on the traffic load $\rho$. We can see that the performance of the AMW actually traces the optimal performance of the PMW. This observation suggests that the adaptive strategy of the AMW in fact allows it to capture the optimal schedule reconfiguration rate based solely on the queue lengths information and no prior knowledge of the arrival statistics is required.

Figure 9:
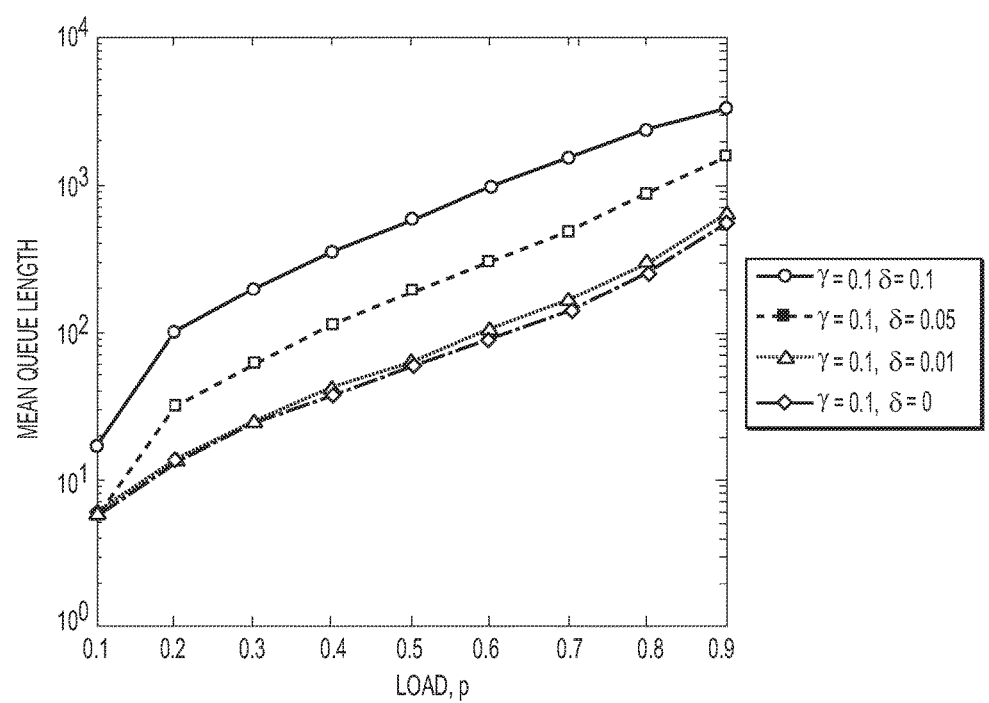
FIG. 9 is a graph showing the mean queue length versus traffic load for the Adaptive MaxWeight (AMW) under different sublinear exponents 6.
Figure 10:
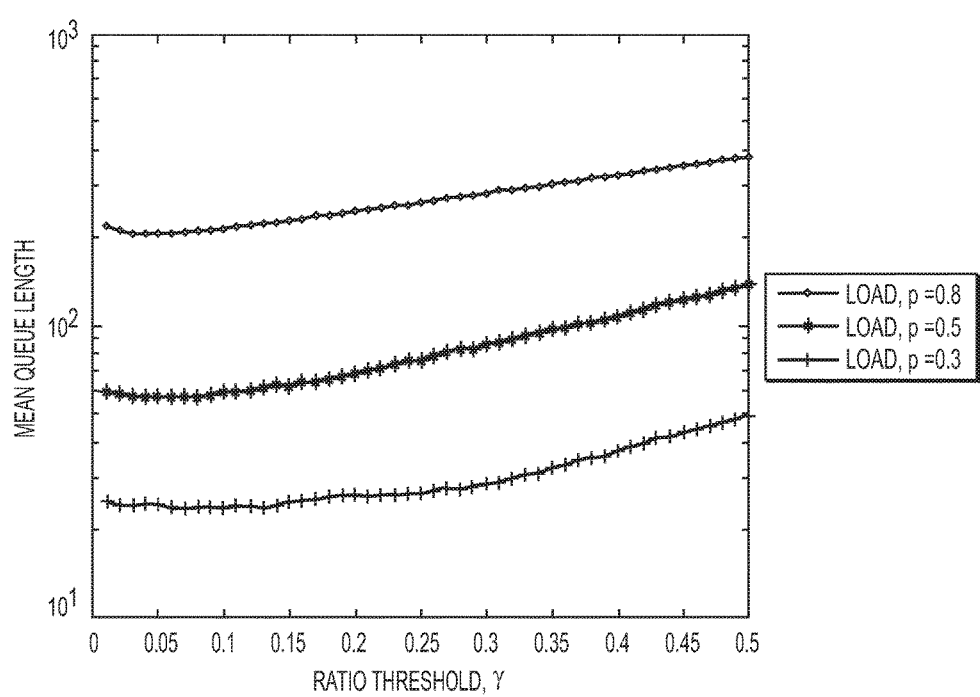
FIG. 10 is a graph showing the mean queue length of the AMW algorithm versus the threshold value γ.

Finally we consider the effect of the parameter selection for the AMW policy. FIG. 9 shows the performance for different values of sublinear exponent $\delta$. Note that the mean queue length becomes shorter when $\delta$ is smaller. Although the stability for the case $\delta=0$ is not covered in the previous section, we see from the simulation that it is stable for admissible traffic and has the best performance. We then consider the selection of the ratio threshold $\gamma$. FIG. 10 presents the mean queue length varying with the ratio threshold $\gamma$ under different traffic loads $\rho=\{0.3, 0.5, 0.8\}$. We may observe that the performance is fairly smooth under a wide range of $\gamma$ values. The optimal value of $\gamma$ varies slightly with the traffic load $\rho$. However, in the region $\gamma \in [0.05, 0.1]$, the delay performance is generally good across different traffic loads.

VI. Conclusion

In this application the end-to-end scheduling problem is considered for a network such as an all-optical data center network. The entire network can be viewed as a generalized crossbar interconnect with nonzero schedule reconfiguration delay. We first proposed a decoupling of three fundamental time series: namely, the monitoring time instances $\{t_k^M\}$, the computation time instances $\{t_k^C\}$, and the schedule reconfiguration time instances $\{t_k^S\}$. This decoupling of the monitoring rate and the schedule reconfiguration rate results in a performance gain associated with "active monitoring" and "frequent computations". Utilizing an active monitoring paradigm, the Periodic MaxWeight (PMW) and the Adaptive MaxWeight (AMW) policies were proposed. The proposed policies are shown to achieve queue stability via theoretical analysis and to outperform the benchmark scheduling policy TMS through simulations.

Another aspect of this work is to show the benefit of the adaptive scheduling in all-optical data center networks with reconfiguration delay. The proposed adaptive policy AMW illustrates that utilizing the adaptive scheme, a scheduling policy could achieve the full stability region without prior knowledge of the traffic statistics. In contrast, the periodic scheduling policy PMW requires the prior knowledge of the traffic load in order to guarantee stability of the network. The stability guarantees are established both analytically and empirically through simulations under i.i.d. arrival traffic. The proposed scheduling policies in this work considers zero in-network buffer due to the inherently bufferless nature of the optical circuits. It is interesting to note that the notion of edge-buffering and end-to-end scheduling has also been explored in the regime of electronic packet-switched data center network (see J. Perry, A. Ousterhout, H. Balakrishnan, D. Shah, and H. Fugal, "Fastpass: A Centralized Zero-Queue Datacenter Network," in *ACM SIGCOMM* 2014, (Chicago, Ill.), August 2014.) recently, in an effort to reduce buffering and congestion within the network. This suggests that our proposed scheduling policies can also be utilized in the context of electronic packet switches (with in-network buffering) in order to further reduce delay and improve performance.

Figure 11:
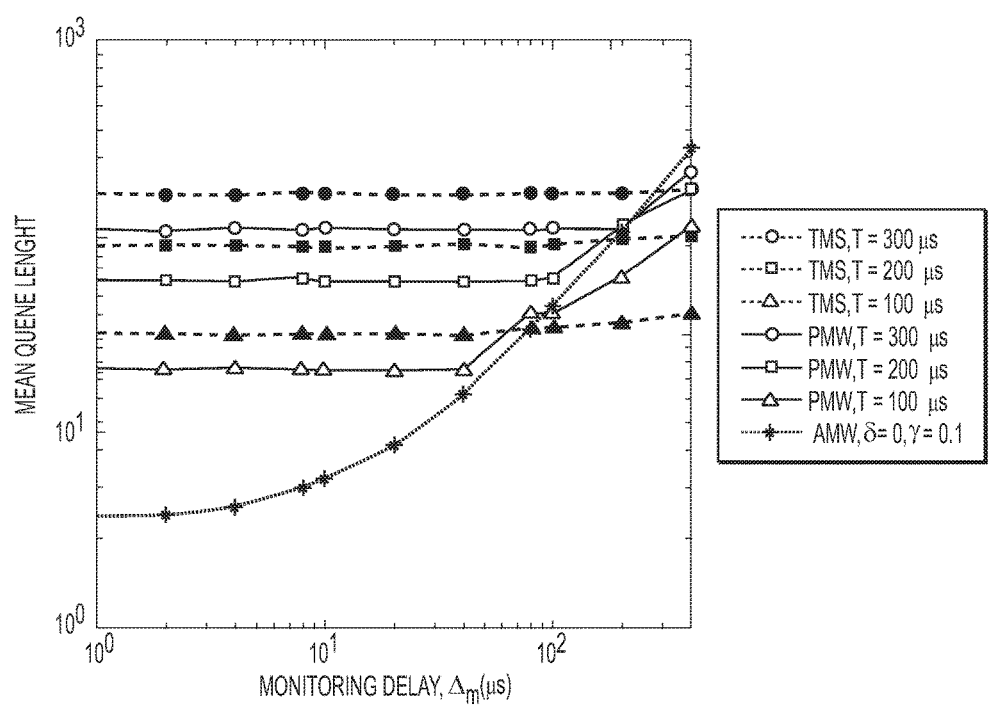
FIG. 11 is a graph showing the mean queue length versus monitoring delay $\Delta_m$ under nonuniform traffic.

In this work we consider primarily the case of negligible monitoring delay and computation delay, i.e. $\Delta_m, \Delta_c \approx 0$. In practice, however, we usually have $\Delta_c, \Delta_m > 0$ and especially $\Delta_m$ to grow with respect to the scale of the network or the monitoring system used. Although $\Delta_m$ do not affect the system stability, the value of $\Delta_m$ does affect the delay performance of scheduling policies. As seen in FIG. 11, in the small $\Delta_m$ regime, the AMW policy achieves substantially better performance over the comparing scheduling policies. In contrast, as $\Delta_m$ increases, the performance of the AMW policy sees a significant degradation. This observation motivates two directions for future research: 1) the development of low delay ToR monitoring system and 2) improvements to the AMW policy in order to increase the robustness with respect to the monitoring delay $\Delta_m$.

Several aspects of the centralized scheduler described in the foregoing description and illustrated in the accompanying drawing for scheduling connections in a switching arrangement such as a single switch or a network of switches. The various modules, components, circuits, steps, processes, algorithms, etc. (collectively referred to as "elements") of the centralized scheduler may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionalities described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on computer-readable storage media. Computer-readable storage media may include any non-transitory storage media such as, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable media for storing or transmitting software. The computer-readable media may be resident in the processing system, external to the processing system, or distributed across multiple entities including the processing system. Computer-readable media may be embodied in a computer-program product. By way of example, a computer-program product may include one or more computer-readable media in packaging materials. Those skilled in the art will recognize how best to implement the described functionality presented throughout this disclosure depending on the particular application and the overall design constraints imposed on the overall system.

Appendix Consider the dynamics of the edge queue lengths L(t) at the stopping times $t_k$ as $$L(t_{k+1}) = L(t_k) + \sum_{t=1}^{T} [A(t_k + t) - D(t_k + t)] \quad (1)$$

In the proofs of this appendix, we consider the quadratic Lyapunov function for the edge queue lengths as $V(L)=\langle L, L\rangle = \sum_{i=1}^{N}\sum_{j=1}^{N} L_{ij}^2$, and show that L(t) satisfies the following Foster-Lyapunov Theorem:

Fact 1 (Foster-Lyapunov. See E. Leonardi, M. Mellia, F. Neri, and M. Ajmone Marsan, "Bounds on average delays and queue size averages and variances in input-queued cell-based switches," in *INFOCOM* 2001. *Twentieth Annual Joint Conference of the IEEE Computer and Communications Societies. Proceedings. IEEE*, vol. 2, pp. 1095-1103 vol. 2, 2001.). Given a system of edge queues $Q_{ij}$, $1 \leq i, j \leq N$, with queue occupancies $L(t)=[L_{ij}(t)]$. Let $\{t_k\}$ be a sequence of stopping times. Let there exist positive real numbers $\in > 0$ and $B>0$, and a lower bounded, real-valued Lyapunov function V(L) such that $$\mathbb{E}[V(L(t_{k+1}))|L(t_k)] < \infty, \forall L(t_k) \quad (1)$$

$$\mathbb{E}[V(L(t_{k+1})) - V(L(t_k))|L(t_k)] \leq -\in \|L(t_k)\|, \quad (2)$$

$$\forall \|L(t_k)\| > B$$

where $\|L\|=\sqrt{\langle L,L\rangle}$ is the 2-norm of queue occupancies. Then the system of edge queues is strongly stable.

A. Proof of Theorem 1

Proof: We select T such that $$T > \frac{\Delta_r}{1-\rho},$$

and define the sequence of stopping times as $t_k=kT$. The expected drift of the Lyapunov function is then given by $$\mathbb{E}[V(L(t_{k+1})) - V(L(t_k)) | L(t_k)] = \quad (2)$$
$$\mathbb{E}[\langle L(t_{k+1}), L(t_{k+1})\rangle - \langle L(t_k), L(t_k)\rangle | L(t_k)] =$$
$$\mathbb{E}[\langle 2L(t_k) + \Delta L_k, \Delta L_k\rangle | L(t_k)]$$

where $\Delta L_k=\sum_{t=1}^{T}(A(t_k+t)-D(t_k+t))$. The assumption of finite support of the arrival process then implies the finiteness of $\Delta L_k$, hence there exists a bound $C<\infty$ such that $\langle \Delta L_k, \Delta L_k\rangle \leq C$.

Since the first $\Delta_r$ time slots in the $[t_k, t_{k+1}]$ interval is the reconfiguration time, $D(t_k+t)=0$ for $t\in[0, \Delta_r]$, we have $$\mathbb{E}[\langle L(t_k), \Delta L_k\rangle | L(t_k)] = \quad (3)$$
$$\sum_{t=1}^{T}\langle L(t_k), \lambda\rangle - \sum_{t=\Delta_r+1}^{T}\mathbb{E}[\langle L(t_k), D(t_k+t)\rangle | L(t_k)] =$$

-continued
$$\sum_{t=\Delta_r+1}^{T}\left\langle L(t_k), \frac{T}{T-\Delta_r}\lambda - S^*(t_k)\right\rangle +$$
$$\sum_{t=\Delta_r+1}^{T}\mathbb{E}[\langle L(t_k), S^*(t_k) - D(t_k+t)\rangle | L(t_k)]$$

Let $$\lambda_r = \frac{T}{T-\Delta_r}\lambda,$$

then since the traffic load is $\rho$ and $$\frac{T}{T-\Delta_r} = \frac{1}{1-\frac{\Delta_r}{T}} < \frac{1}{\rho}, \text{ we have } \lambda_r < \frac{1}{\rho}\lambda$$

and thus $\lambda_r \in \mathcal{C}$. We may then write $\lambda_r=\sum_l \alpha_l S_l$, where $\sum_l \alpha_l < 1$ and $S_l \in \mathcal{F}$ for each l. Let $\delta=1-\sum_l \alpha_l$ then we have $$\langle L(t_k), \lambda_r - s^*(t_k)\rangle \leq \left(\sum_l \alpha_l - 1\right)w^*(t_k) = -\delta w^*(t_k) \quad (4)$$

Note that $S^*(t_k)$ is the schedule used during the period $[t_k, t_{k+1}]$. For $t\in[\Delta_r, T]$, we have $D_{ij}(t_k+t)\neq S^*_{ij}(t_k+t)$ only if $L_{ij}(t_k+t-1)=0$, which then implies $L_{ij}(t_k)\leq T$ since at most one packet could depart from an edge queue at each time slot. We then have the following bound:

$$\mathbb{E}\left[\sum_{t=\Delta_r+1}^{T}\langle L(t_k), S^*(t_k) - D(t_k+t)\rangle \bigg| L(t_k)\right] \leq \quad (5)$$
$$\sum_{t=\Delta_r+1}^{T}\sum_{i,j=1}^{N} TS^*_{ij}(t_k) \leq (T-\Delta_r)NT$$

Combining eqs. (2)-(4), we have
$$\mathbb{E}[V(L(t_{k+1})) - V(L(t_k))|L(t_k)] \leq -2\delta(T-\Delta_r)w^*(t_k) + 2(T-\Delta_r)NT + C$$

Then since $$w^*(t_k) \geq \frac{1}{N}\|L(t_k)\|,$$

Fact 1 establishes the strong stability. □

B. Proof of Theorem 2

Before we proceed to the proof of Theorem 2, we use the following definition and fact for the outdated schedules (see Y. Ganjali, A. Keshavarzian, and D. Shah, "Input queued switches: cell switching vs. packet switching," in *INFOCOM* 2003. *Twenty-Second Annual Joint Conference of the IEEE Computer and Communications. IEEE Societies*, vol. 3, pp. 1651-1658 vol. 3, March 2003.) to establish the relation between the edge queue lengths and the time between two schedule reconfigurations.

Definition 7. At time instance t, the current schedule S(t) is a p-outdated schedule if it is a maximum weight schedule at time t−p, i.e. $S(t)=S^*(t-p)$.

Fact 2 (Lemma 1 of Ganjali et al.). At any time instance t, suppose the current schedule S(t) is a p-outdated schedule, then the difference between the weight of S(t) and the maximum weight at time t is at most $(K+1)pN$, i.e.

$$w(t) \geq w^*(t) - (K+1)pN$$

where K is the bounding constant of the arrival process A(t).

Given the sequence of stopping times $\{t_k\}$ with $t_k = kT$, Fact 2 would imply that when edge queue lengths are large enough, the time between two schedule reconfigurations would be larger than T. Specifically, we show in the following that if a schedule reconfiguration occurs at time $t_c$, and $w^*(t_c) \geq$ $$\left(\frac{1}{1-\gamma}(K+1)TN\right)^{1-\delta} + TN,$$

then no schedule reconfigurations could occur during the time interval $[t_c, t_c+T]$:

Since at most N queues are served each time slot, then $$w^*(t_c + T) \geq \left(\frac{1}{1-\gamma}(K+1)TN\right)^{1-\delta},$$

and by Fact 2

$$w(t_c+T) \geq w^*(t_c+T) - (K+1)TN$$

$$\Rightarrow \Delta w(t_c+T) \leq (K+1)TN \leq (1-\gamma)(w^*(t_c+T))^{1-\delta}$$

then no reconfiguration would occur within $[t_c, t_c+T]$. Hence the condition of large edge queue lengths stated above restricts the reconfiguration frequency. We now start the proof of Theorem 2 with this result.

Proof of Theorem 2:

Similar to the proof in appendix A, we consider stopping times $t_k = kT$, where $$T > \frac{\Delta_r}{1-\rho}.$$

The dynamics of the edge queue lengths at the stopping times is also given by 1.

Consider an interval $[t_k, t_{k+1}]$ where $L(t_k)$ satisfies $$\max_{i,j} L_{ij}(t_k) \geq \frac{1}{1-\gamma}(K+1)TN.$$

The schedule reconfiguration occurs at most once in the interval $[t_k, t_{k+1}]$ as discussed above. Assuming that the schedule reconfigures at time $t_k+d$ (consider $d=T$ if no schedule change occurs in the interval), then the schedules used in the interval can be expressed as $$S(t_k+t) = \begin{cases} S(t_k), & \text{if } 1 \leq t \leq d \\ 0, & \text{if } d < t \leq d+\Delta_r \\ S^*(t_k+d), & \text{if } d+\Delta_r < t \leq T \end{cases}$$

we then have $$\mathbb{E}[\langle L(t_k), \Delta L_k \rangle | L(t_k)] =$$

$$\sum_{t=1}^{T} \mathbb{E}[\langle L(t_k), \lambda - D(t_k+t)\rangle | L(t_k)] \leq \sum_{\substack{t=1 \\ t \notin [s+1, s+\Delta_r]}}^{T} \{\langle L(t_k), \lambda_r - S(t_k+t)\rangle +$$

$$\mathbb{E}[\langle L(t_k), S(t_k+t) - D(t_k+t)\rangle | L(t_k)]\}$$

where $$\lambda_r = \frac{T}{T-\Delta_r}\lambda.$$

The second term is bounded similarly as in (5), hence we have a constant $C' < \infty$ such that $\sum_{t=1}^{T} \mathbb{E}[\langle L(t_k), S(t_k+t) - D(t_k+t)\rangle | L(t_k)] \leq C'$. We now give bounds for the first term.

For $1 \leq t \leq d$:

$$\langle L(t_k), \lambda_r - S(t_k+t)\rangle = \langle L(t_k), \lambda_r - S^*(t_k)\rangle +$$
$$\langle L(t_k), S^*(t_k) - S(t_k)\rangle \leq -\beta w^*(t_k) + (1-\gamma)(w^*(t_k))^{1-\delta} \quad (6)$$

since $\langle L(t_k), S^*(t_k) - S(t_k)\rangle = w^*(t_k) - w(t_k) \leq (1-\gamma)(w^*(t_k))^{1-\delta}$.

For $d+\Delta_r < t \leq T$:

$$\langle L(t_k), \lambda_r - S(t_k+t)\rangle = \langle L(t_k), \lambda_r - S^*(t_k)\rangle +$$
$$\langle L(t_k), S^*(t_k) - S(t_k+d)\rangle \leq -\beta w^*(t_k) + d(K+1)N \quad (7)$$

The bound $\langle L(t_k), S^*(t_k) - S(t_k+d)\rangle \leq d(K+1)N$ follows the similar idea in Fact 2 and is omitted here.

Then with (6), (7), and note that $0 \leq d \leq T$, we have $$\mathbb{E}[\langle L(t_k), \Delta L_k\rangle | L(t_k)] \leq -\beta(T-\Delta_r)w^*(t_k) + d(1-\gamma)$$
$$(w^*(t_k))^{1-\delta} + (T-d-\Delta_r)d(K+1)N + C' \leq -w^*$$
$$(t_k)[\beta(T-\Delta_r) - T(1-\gamma)(w^*(t_k))^{-\delta}] + T(T-\Delta_r)$$
$$(K+1)N + C' \quad (8)$$

Combining eqs. (2) and (8), we have $$\mathbb{E}[V(L(t_{k+1})) - V(L(t_k)) | L(t_k)] \leq -2w^*(t_k)[\beta(T-\Delta_r) - T(1-\gamma)(w^*(t_k))^{-\delta}] + 2T(T-\Delta_r)(K+1)N + 2C' + C \quad (9)$$

Since $$w^*(t_k) \leq \frac{1}{N}\|L(t_k)\|$$

and $\delta > 0$, we have that $(w^*(t_k))^{-\delta}$ is small when the norm of the queue occupancies $\|L(t_k)\|$ is large. The stability is then constructed by Fact 1.

The invention claimed is:

1. A method for scheduling connections between input and output ports of a network switching arrangement over which a data packet is communicated, comprising:
   (a) initializing a schedule that specifies a sequence of time slots during each of which at least one connection is established between a specified input port and a specified output port of the network switching arrangement;
   (b) determining a size of a queue associated with each of the connections, the queues storing data packets to be communicated over the respective connections;
   (c) determining a weight of a current schedule, the weight reflecting a collective size as determined in (b) of all the queues associated with all of the connections through the network switching arrangement;
   (d) determining a difference between the current schedule and a maximum schedule having a largest weight;
   (e) when the difference between the current schedule and the maximum schedule exceeds a threshold, changing the current schedule to the maximum schedule.

2. The method of claim 1 wherein the network switching arrangement is a single network switch.

3. The method of claim 1 wherein the network switching arrangement includes a plurality of network switches interconnected with one another in a network, the input and output ports of the network switches being coupled to end nodes.

4. The method of claim 3 wherein the network is a circuit-switched network having a non-zero circuit setup time.

5. The method of claim 3 wherein the network switches are optical switches.

6. The method of claim 5 wherein the end nodes are top of rack (TOR) switches.

7. The method of claim 3 wherein each of the plurality of network switches has a reconfiguration delay during which connections between input and output ports are changed, the reconfiguration delay extending for a duration in time during which no packets are deliverable from the input ports to the output ports.

8. The method of claim 1 wherein the size of the queue is a queue length.

9. The method of claim 1 wherein the size of the queue is a wait time for packets in the queue.

10. The method of claim 1 wherein each of the time slots has a duration sufficient to transmit a data packet.

11. The method of claim 1 further comprising, after performing step (e), repeating steps (b)-(e).

12. The method of claim 1 wherein changing the current schedule to the maximum schedule includes changing the current schedule to the maximum schedule when and only when the difference between the current schedule and the maximum schedule exceeds the threshold value.

13. The method of claim 1 wherein determining the size of the queues includes continuously monitoring the size of the queues.

14. The method of claim 1 further comprising determining the maximum schedule.

15. The method of claim 14 further comprising determining the maximum schedule at every timeslot.

16. The method of claim 15 wherein determining the difference between the current schedule and the maximum schedule includes determining the difference between the current schedule and the maximum schedule at every timeslot.

17. The method of claim 1 wherein the threshold is a function of the largest weight.

18. The method of claim 1 wherein the threshold is a sublinear function.

19. A non-transitory computer-readable storage medium containing instructions which, when executed by one or more processors, performs a method for scheduling connections between input and output ports of a network switching arrangement over which a data packet is communicated, comprising:
  (a) initializing a schedule that specifies a sequence of time slots during each of which at least one connection is established between a specified input port and a specified output port of the network switching arrangement;
  (b) determining a size of a queue associated with each of the connections, the queues storing data packets to be communicated over the respective connections;
  (c) determining a weight of a current schedule, the weight reflecting a collective size as determined in (b) of all the queues associated with all of the connections through the network switching arrangement;
  (d) determining a difference between the current schedule and a maximum schedule having a largest weight;
  (e) when the difference between the current schedule and the maximum schedule exceeds a threshold, changing the current schedule to the maximum schedule.

20. The non-transitory computer-readable storage medium of claim 19 wherein the threshold is a sublinear function of the largest weight.

* * * * *